(12) United States Patent
Cromer et al.

(10) Patent No.: US 7,269,723 B2
(45) Date of Patent: Sep. 11, 2007

(54) REDUCING THE BOOT TIME OF A CLIENT DEVICE IN A CLIENT DEVICE/DATA CENTER ENVIRONMENT

(75) Inventors: Daryl C. Cromer, Apex, NC (US); Howard J. Locker, Cary, NC (US); Randall S. Springfield, Chapel Hill, NC (US); Rod D. Waltermann, Rougemont, NC (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 11/038,630

(22) Filed: Jan. 19, 2005

(65) Prior Publication Data

US 2006/0161765 A1 Jul. 20, 2006

(51) Int. Cl.
*G06F 9/24* (2006.01)
(52) U.S. Cl. .......................................... 713/2; 709/222
(58) Field of Classification Search ..................... None
See application file for complete search history.

(56) References Cited

U.S. PATENT DOCUMENTS 6,052,779 A * 4/2000 Jackson et al. ................ 713/2
2003/0097487 A1   5/2003 Rietze et al. ................ 709/325
2003/0135729 A1* 7/2003 Mason et al. .................... 713/2
2004/0003082 A1   1/2004 Abbondanzio et al. ..... 709/225
2004/0059900 A1* 3/2004 Backman et al. ............... 713/1
2004/0088414 A1   5/2004 Flynn et al. ................ 709/226
2004/0162977 A1   8/2004 King et al. .................... 713/2
2005/0283597 A1* 12/2005 Holzmann ..................... 713/2
2006/0184780 A1* 8/2006 Yamada et al. ................ 713/1

* cited by examiner

*Primary Examiner*—Thuan Du
(74) *Attorney, Agent, or Firm*—Robert A. Voigt, Jr.; Winstead PC

(57) ABSTRACT

A method, computer program product and system for reducing the boot time of a client device in a client device/data center environment. A profile of the client device, which includes information regarding the usage characteristics of the client device, may be created. A confidence level indicating the likelihood that the client device is going to be booted may be determined based on the client device's profile. The confidence level and the utilization of the resources of the server blades in the data center may be examined in determining whether to have an appropriate server blade perform an action involved in booting the operating system of the client device. If the appropriate server blade performs such an action, e.g., pre-booting the client device's operating system, prior to the user of the client device attempting to boot its operating system, then the boot time may be reduced.

18 Claims, 5 Drawing Sheets

REDUCING THE BOOT TIME OF A CLIENT DEVICE IN A CLIENT DEVICE/DATA CENTER ENVIRONMENT

TECHNICAL FIELD

The present invention relates to the field of computer systems and more particularly to reducing the boot time of a client device in a client device/data center environment.

BACKGROUND INFORMATION

Computer systems start executing instructions by performing what is commonly referred to as "booting." These instructions may be stored in a Read Only Memory (ROM) or flash memory chip that are automatically executed upon startup, i.e., upon the user of the computer system depressing the power switch. These instructions, upon execution, search for the operating system, load it and pass control to it. The loading and passing control to the operating system may be referred to as "booting the operating system." Upon loading the operating system, the operating system creates the environment for all application programs that run on the computer system. The duration of time between the user depressing the power switch to the loading and execution of the operating system may be referred to as "boot time". Typically, the boot time for a computer system is a short amount of time, e.g., 30 seconds or less.

Computer users have become accustomed to a rather short boot time. However, in certain types of environments, such as a client device/data center environment, the boot time of a computer may be significantly longer.

In a client device/data center environment, multiple computer systems, referred to as client devices, may be coupled to a data center that includes a control module and multiple computer systems, referred to as server blades. A client device may refer to a computer system with input/output capabilities but does not include any processing capability. These processing elements may instead reside in a server blade. A server blade may refer to a server that does not include a storage resource, e.g., storage array. The storage resource may be a separate unit that is shared among the server blades.

The present method for booting the client device, i.e., booting the operating system of the client device, includes the client device sending a command to boot its operating system to the control module of the data center. The control module first authenticates the client device. The control module may then search the available server blades for a server blade that meets the client device's requirements. The control module may then locate the client device's image file, i.e., operating system. Upon locating the client device's image file, the control module loads the client device's image file into the appropriate server blade. Once the client device's image file is loaded into the appropriate server blade, the server blade then boots the client device's image file using a resource allocated to boot the client device's image file. Since booting to the operating system of the client device includes authenticating the client device, locating and loading the client device's image file, allocating a resource in the server blade to boot the client device's image file and then finally booting the client device's image file, the boot time for a client device in a client device/data center environment is significantly greater than for a typical personal computer.

Since users of personal computers are accustomed to a rather quick boot time, the user of a client device in a client device/data center environment may be dissatisfied with the boot time that takes significantly longer.

Therefore, there is a need in the art to reduce the boot time for a client device in a client device/data center environment.

SUMMARY

The problems outlined above may at least in part be solved in some embodiments by performing an action, such as pre-booting the client device's operating system in the server blade, prior to the user attempting to boot the client device thereby reducing the boot time. The boot time may be reduced since some of the actions that are necessary to boot the operating system of the client device were previously performed prior to the user of the client device attempting to boot the client device.

In one embodiment of the present invention, a method for reducing the boot time of a client device in a client device/data center environment may comprise the step of creating a profile of the client device. The method may further comprise determining a confidence level as to whether the client device is likely to be booted based on the profile of the client device. The method may further comprise examining the confidence level and utilization of a plurality of server blades. The method may further comprise performing an action based on the confidence level and the utilization of the server blades where the action is involved in booting an operating system of the client device. Further, the action is performed prior to a user of the client device attempting to boot the operating system of the client device.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for reducing the boot time of a client device in a client device/data center environment. In one embodiment of the present invention, a profile of the client device which includes information regarding the usage characteristics of the client device may be created. A confidence level indicating the likelihood that the client device is going to be booted may be determined. The confidence level may be determined based on the client device's profile. The confidence level and the utilization of the resources of the server blades in the data center may be examined in determining whether to have an appropriate server blade (one that meets the requirements of the client device) perform an action, e.g., pre-booting the client device's image, involved in booting the operating system of the client device. If the appropriate server blade performs the action, e.g., pre-booting the client device's image, involved in booting the operating system of the client device prior to the user of the client device attempting to boot its operating system, then the boot time may be reduced.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
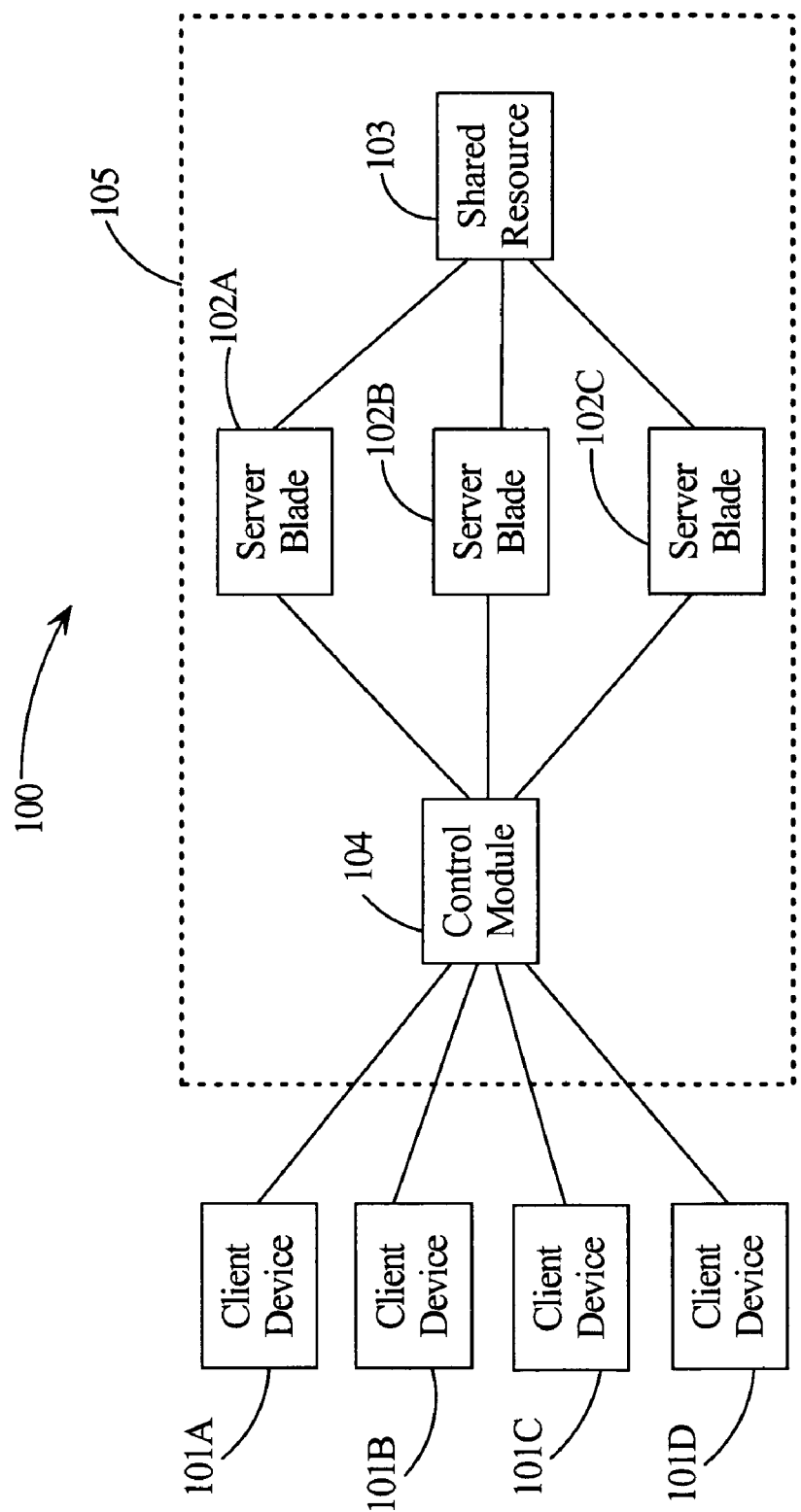
FIG. 1 illustrates an embodiment of the present invention of client device/data center environment.

FIG. 1—Client Device/Data Center Environment

FIG. 1 illustrates an embodiment of the present invention of a client device/data center environment 100. Client device/data center environment 100 may include a plurality of client devices 101A-D coupled to a data center 105. Data center 105 may include a control module 104 coupled to client devices 101A-D. Data center 105 may further include a plurality of server blades 102A-C coupled to control module 104 and a shared resource 103 coupled to server blades 102A-C. Client devices 101A-D may collectively or individually be referred to as client devices 101 or client device 101, respectively. Client device 101 may refer to a computer system that does not include any processing capability. A more detail description of client device 101 is provided below in association with FIG. 2. Server blades 102A-C may collectively or individually be referred to as server blades 102 or server blade 102, respectively. Server blade 102 may refer to a server that does not include a storage resource, e.g., storage array. Server blade 102 may be configured to control the processing capability of a particular client device 101. Referring to FIG. 1, each server blade 102 may be coupled to shared resource 103 which may function as the resource, i.e., storage device, for server blades 102. A more detail description of server blade 102 is provided further below in association with FIG. 3.

Referring to FIG. 1, each client device 101 may send commands, such as a command to boot its operating system, to control module 104. Control module 104 upon receipt of a command from client device 101 may authenticate client device 101 as well as identify an appropriate server blade 102 that meets client device's 101 requirements. Control module 104 may then forward the received commands to the appropriate server blade 102. Further, if control module 104 receives a command from client device 101 to boot its operating system, control module 104 may identify and load the client device's 101 image file into the appropriate server blade 102. A more detail description of control module 104 is provided further below in association with FIG. 4.

It is noted that the connections between the devices described above, e.g., client device 101, server blade 102, shared resource 103, control module 104, may be any medium type, e.g., wired, wireless. It is further noted that client device/data center environment 100 may include any number of client devices 101, server blades 102 and shared resources 103 and that FIG. 1 is illustrative. It is further noted that each server blade 102 may control the processing capability of any number of client devices 101. It is further noted that client device/data center environment 100 may be any type of system that includes a client device 101 and a server blade 102 and that FIG. 1 is not to be limited in scope to any one particular embodiment.

Figure 2:
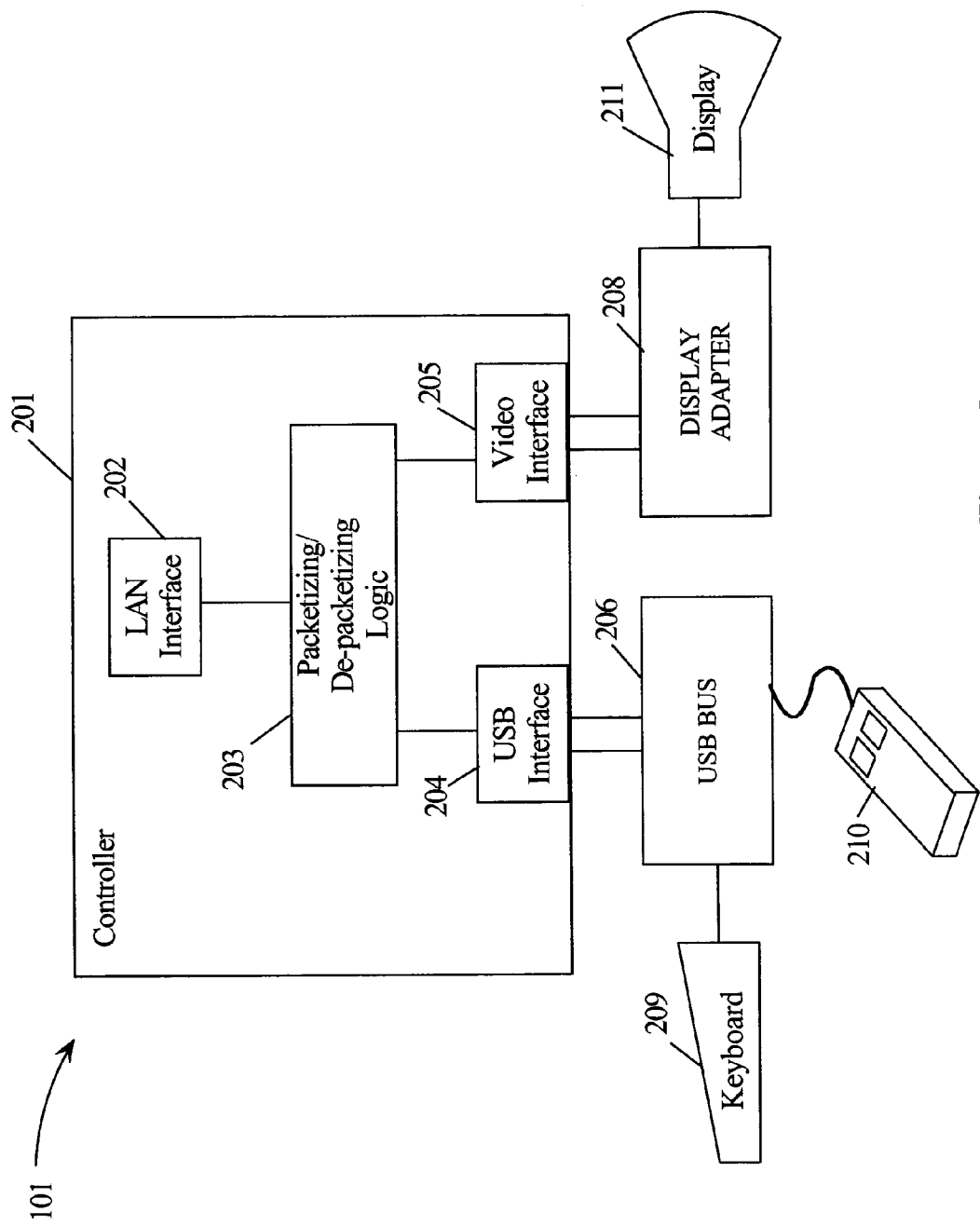
FIG. 2 illustrates an embodiment of the present invention of a hardware configuration of a client device.

FIG. 2—Hardware Configuration of Client Device

FIG. 2 illustrates a typical hardware configuration of client device 101 (FIG. 1) which is representative of a hardware environment for practicing the present invention. Client device 101 may include a controller 201 configured to receive and send packets of data, e.g., Ethernet packets, from and to server blade 102 (FIG. 1) via control module 104 (FIG. 1). Controller 201 may include a Local Area Network (LAN) interface 202 coupled to a LAN network (not shown) which enables client device 101 to communicate with server blade 102 via control module 104. Controller 201 may further include packetizing/de-packetizing logic 203 configured to extract data in the payload of the data packets received over LAN interface 202. Packetizing/de-packetizing logic 203 may further be configured to insert data in the payload of a data packet to be sent to data center 105 (FIG. 1) over LAN interface 202.

Controller 201 may further include a Universal Serial Bus (USB) interface 204 and a video interface 205 coupled to packetizing/de-packetizing logic 203. USB interface 204 may be coupled to USB bus 206. I/O devices may be connected to controller 201 via USB bus 206 and a display adapter 208 coupled to video interface 205. Keyboard 209 and mouse 210 may be interconnected to USB bus 206. Data may be inputted to client device 101 through any of these devices. A display monitor 211 may be connected to video interface 205 by display adapter 208. In this manner, a user is capable of inputting to client device 101 through keyboard 209 or mouse 210 and receiving output from client device 101 via display 211.

Upon the user inputting to client device 101, the input is received by USB interface 204 which is inserted into the payload of a packet by packetizing/de-packetizing logic 203 in order to be transmitted to data center 105 via LAN interface 202. Additionally, the packet received by client device 101 may include a command to update the visual display. Packetizing/de-packetizing logic 203 may extract the command to update the visual display, including information as to how to update the display. Packetizing/de-packetizing logic 203 may then forward the command to update the visual display, including information as to how to update the display, to display 211 via video interface 205 and display adapter 208. In this manner, the display may be continually updated by commands from the appropriate server blade 102.

Figure 3:
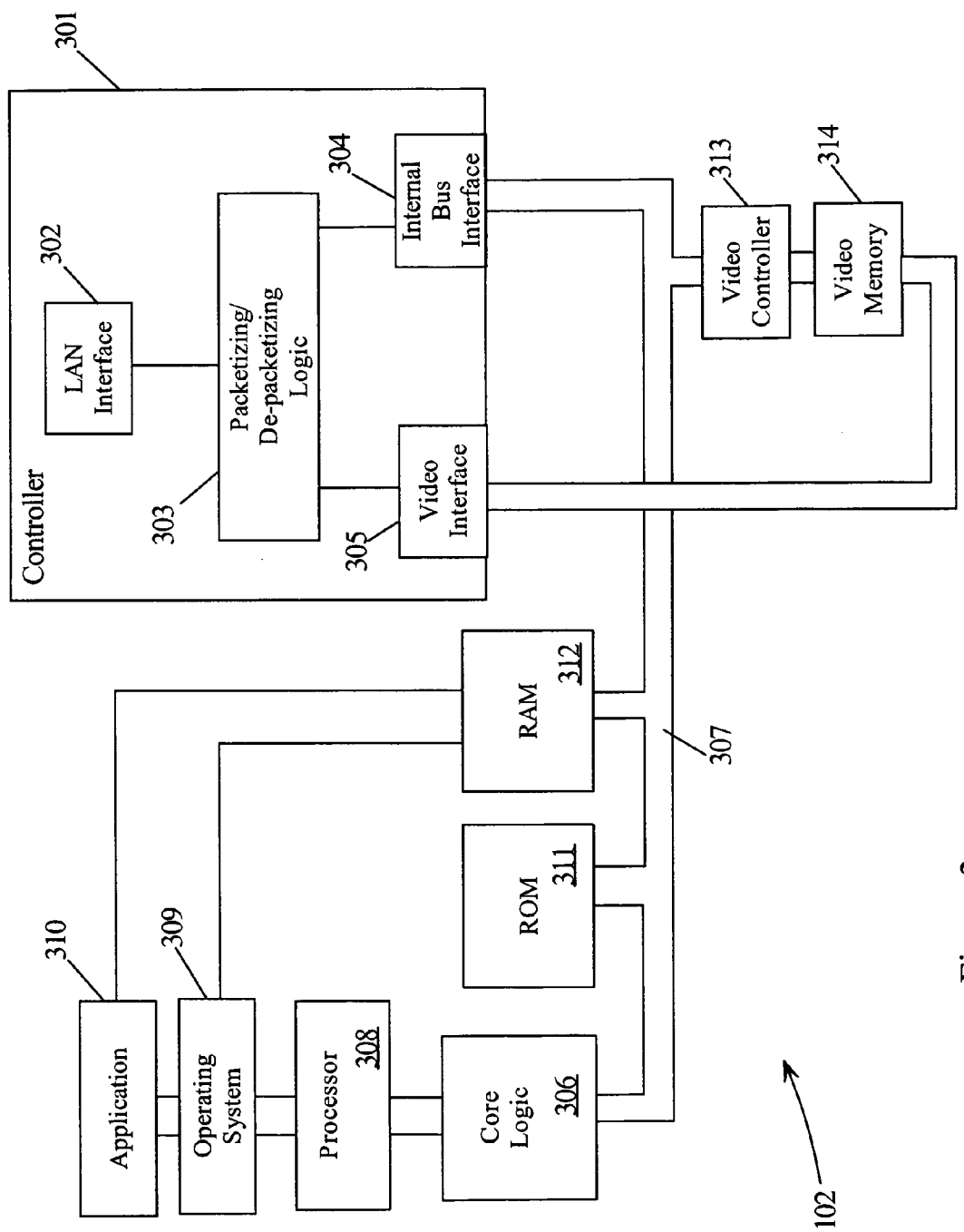
FIG. 3 illustrates an embodiment of the present invention of a hardware configuration of a server blade.

FIG. 3—Hardware Configuration of Server Blade

FIG. 3 illustrates a typical hardware configuration of server blade 102 (FIG. 1) which is representative of a hardware environment for practicing the present invention. Server blade 102 may include a controller 301 configured to receive and send packets of data, e.g., Ethernet packets, from and to client device 101 (FIG. 1) via control module 104 (FIG. 1). Controller 301 may include a Local Area Network (LAN) interface 302 coupled to a LAN network (not shown) which enables server blade 102 to communicate with client device 101 via control module 104 or to shared resource 103 (FIG. 1). Controller 201 may further include a packetizing/de-packetizing logic 303 configured to extract data in the payload of the data packets received over LAN interface 302. Packetizing/de-packetizing logic 303 may further be configured to insert data in the payload of a data packet to be sent to client device 101 over LAN interface 302.

Controller 201 may further include an internal bus interface 304 and a video interface 305 coupled to packetizing/de-packetizing logic 303. Bus interface 304 may be coupled to core logic 306 via system bus 307. Core logic 306 may be the primary processing logic of server blade 102. Processor 308 may be coupled to core logic 306. An operating system 309 may run on processor 308 and provide control as well as coordinate the function of the various components of FIG. 3. Application 310 in accordance with the principles of the present invention may run in conjunction with operating system 309 and provide calls to operating system 309 where the calls implement the various functions or services to be performed by application 310. Application 310 of server blade 102 may include for example, a program for performing an action involved in booting an operating system of client device 101 prior to the user of client device 101 attempting to boot its operating system, as discussed below in association with FIG. 5.

Read only memory (ROM) 311 may be coupled to system bus 307 and include a basic input/output system ("BIOS") that controls certain basic functions of server blade 102. Random access memory (RAM) 312 may also be coupled to system bus 307. It should be noted that software components including operating system 309 and application 310 may be loaded into RAM 312 which may function as the server blade's 102 main memory. It is noted that the program of the present invention that performs an action involved in booting an operating system of client device 101 prior to the user of client device 101 attempting to boot its operating system, as discussed below in association with FIG. 5, may reside in either application 310 or in ROM 311.

Referring to FIG. 3, server blade 102 may further include a video controller 313 coupled to bus 307. A video memory 314 may be coupled to video controller 313 and to video interface 305. As stated above, packetizing/de-packetizing logic 303 may be configured to extract data in the payload of the data packets received over LAN interface 302. This data may include a user input command to client device 101, e.g., move mouse 210 (FIG. 2). The input command may be processed by processor 308. Upon processing the received data by processor 308, the command may involve updating the display of display 211 (FIG. 2) of client device 101. The processed command may be sent to video controller 313 to provide a command to client device 101 to update the display of display 211. The command to update visual display 211, including information as to how it should be displayed, is stored in video memory 314 as well as sent to packetizing/de-packetizing logic 303 via video interface 305. Upon receipt of the command to update visual display 211, including information as to how it should be displayed, packetizing/de-packetizing logic 303 inserts the command in a payload of a data packet to be sent to client device 101 via LAN interface 302.

Implementations of the invention include implementations as a computer system programmed to execute the method or methods described herein, and as a computer program product. According to the computer system implementations, sets of instructions for executing the method or methods are resident in the random access memory 312 of one or more computer systems configured generally as described above. Until required by server blade 102, the set of instructions may be stored as a computer program product in another computer memory. Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
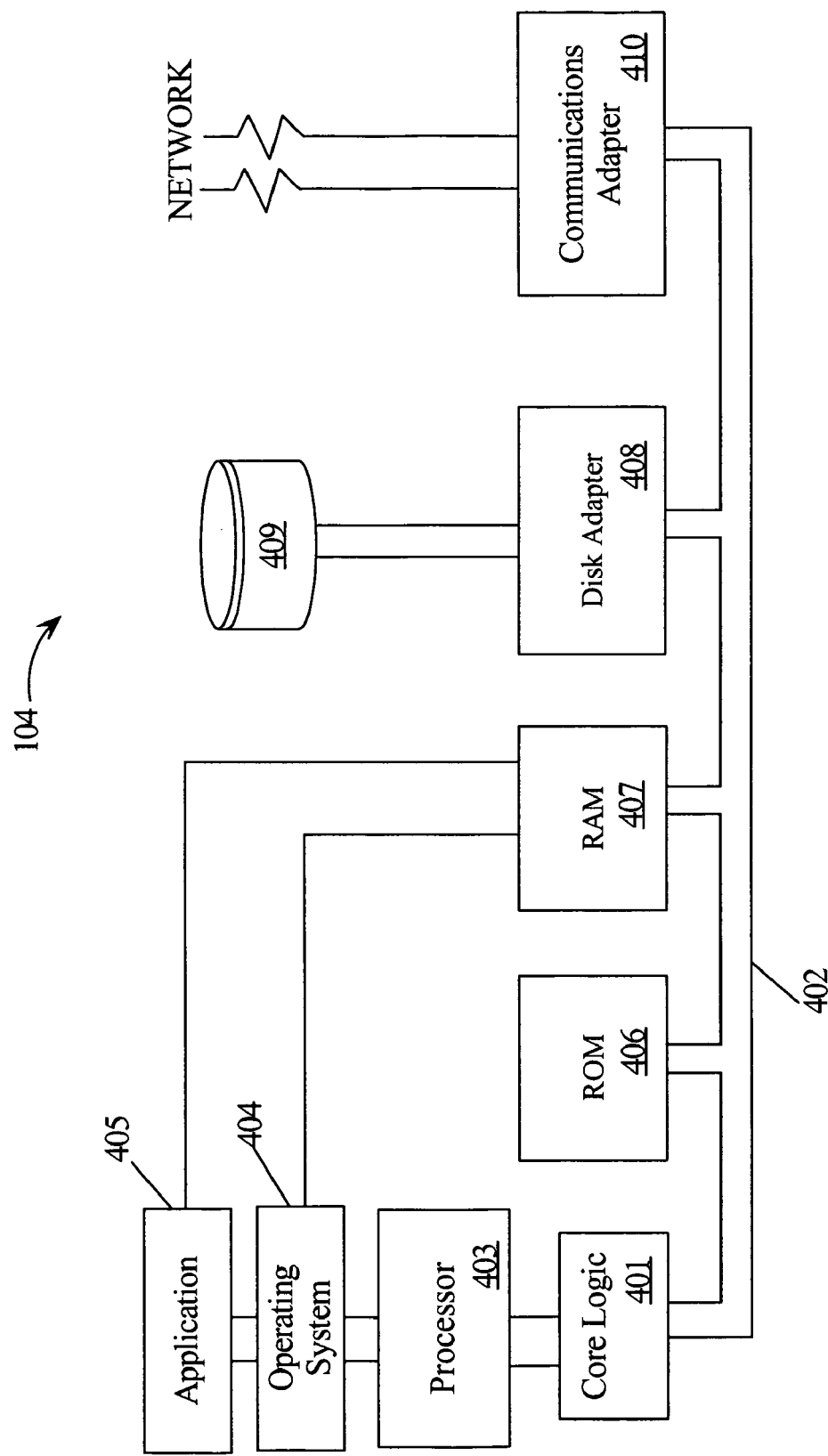
FIG. 4 illustrates an embodiment of the present invention of a hardware configuration of a control module.

FIG. 4—Hardware Configuration of Control Module

FIG. 4 illustrates an embodiment of the present invention of control module 104 (FIG. 1). Control module 104 may comprise a core logic 401, which may be the primary processing logic of control module 104. Core logic 401 is coupled to various other components by a system bus 402. Processor 403 may be coupled to core logic 401. An operating system 404 may run on processor 403 and provide control as well as coordinate the function of the various components of FIG. 4. Application 405 in accordance with the principles of the present invention may run in conjunction with operating system 404 and provide calls to operating system 404 where the calls implement the various functions or services to be performed by application 405. Application 405 of control module 104 may include for example, a program for reducing the boot time of a client device in a client device/data center environment as described below in association with FIG. 5.

Read only memory (ROM) 406 may be coupled to system bus 402 and include a basic input/output system ("BIOS") that controls certain basic functions of control module 104. Random access memory (RAM) 407 and disk adapter 408 may also be coupled to system bus 402. It should be noted that software components including operating system 404 and application 405 may be loaded into RAM 407 which may be control module's 104 main memory for execution. Disk adapter 408 may be an integrated drive electronics ("IDE") adapter that communicates with a disk unit 409, e.g., disk drive. It is noted that the program of the present invention that reduces the boot time of a client device in a client device/data center environment, as described below in association with FIG. 5, may reside in either application 405 or in disk unit 409.

Referring to FIG. 4, communications adapter 410 may also be coupled to system bus 402. Communications adapter 410 may interconnect bus 402 with a network, e.g., LAN, enabling control module 104 to communicate with client device 101 (FIG. 1), server blade 102 (FIG. 2).

Implementations of the invention include implementations as a computer system programmed to execute the method or methods described herein, and as a computer program product. According to the computer system implementations, sets of instructions for executing the method or methods are resident in the random access memory 407 of one or more computer systems configured generally as described above. Until required by control module 104, the set of instructions may be stored as a computer program product in another computer memory. Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

As stated in the Background Information section, users of personal computers are accustomed to a rather quick boot time, the user of a client device in a client device/data center environment may be dissatisfied with the boot time that takes significantly longer. Therefore, there is a need in the art to reduce the boot time for a client device in a client device/data center environment. A method for reducing the boot time of a client device in a client device/data center environment is discussed below in association with FIG. 5.

Figure 5:
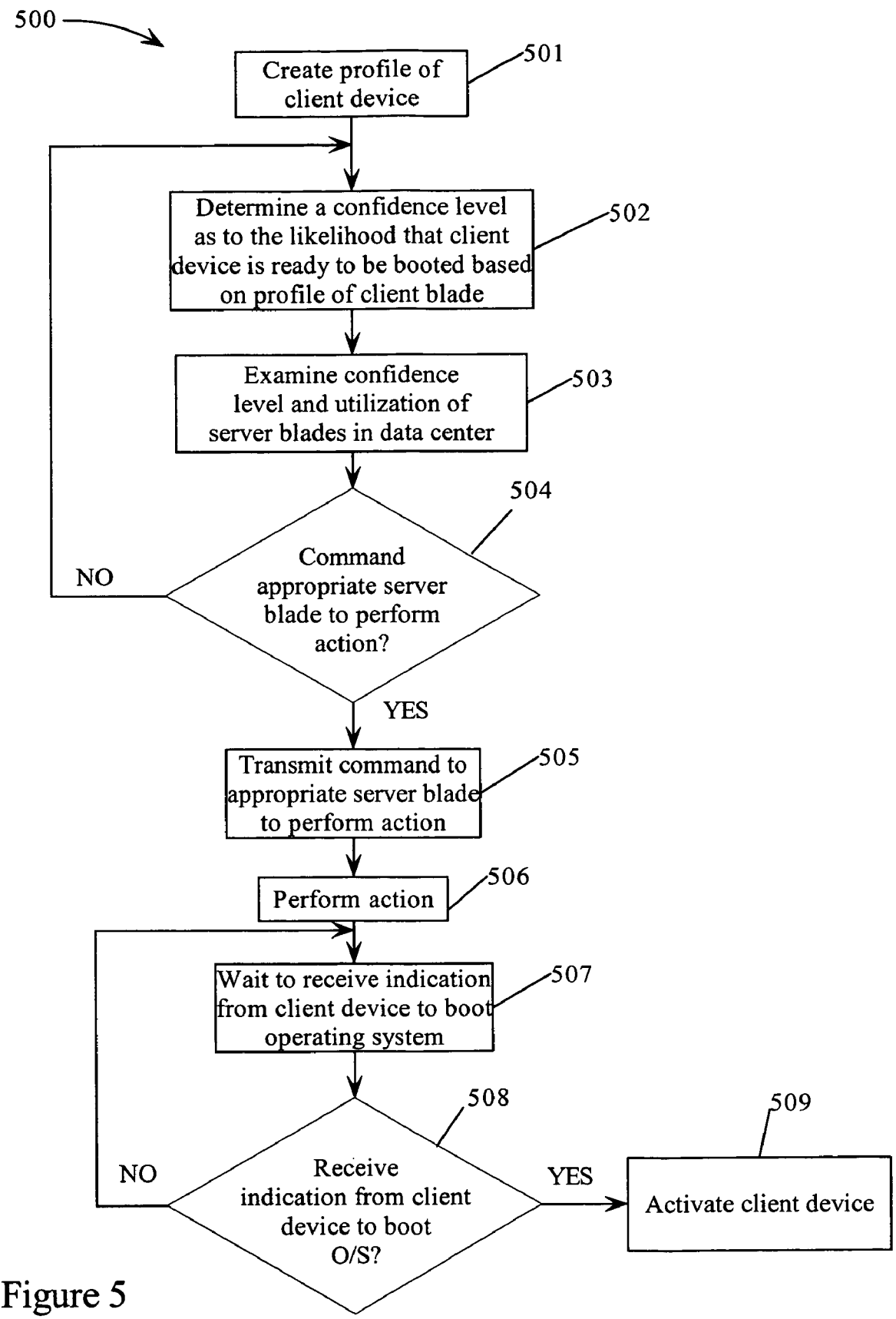
FIG. 5 is a flowchart of a method for reducing the boot time of a client device in a client device/data center environment in accordance with an embodiment of the present invention.

FIG. 5—Method for Reducing the Boot Time of a Client Device in a Client Device/Data Center Environment FIG. 5 is a flowchart of one embodiment of the present invention of a method 500 for reducing the boot time of client device 101 (FIG. 1) in client device/data center environment 100 (FIG. 1).

Referring to FIG. 5, in conjunction with FIGS. 1-4, in step 501, control module 104 creates a profile of client device 101. In one embodiment, the profile of client device 101 includes information regarding the usage characteristics of client device 101. The usage characteristics of client device 101 may involve tracking the activity levels of client device 101 throughout each day. For example, certain users may continuously use client device 101 from a set period of time, e.g., 9 a.m. to 5 p.m. Monday through Friday. Other users of client device 101 may use client device 101 more sporadically throughout the day. In one embodiment, the profile of client device 101 may be created over a long period of time, e.g., weeks, thereby establishing a reliable baseline of usage characteristics. In one embodiment, the profile of client device 101 may be dynamically updated.

After creation of the profile of client device 101, control module 104, in step 502, determines a confidence level as to whether client device 101 is likely to be booted based on the profile of client device 101. The confidence level may be based, in addition to the profile of client device 101, on the present time and day. For example, if it is presently 5 a.m. on a Monday and client device 101 in question is typically not active until 7 a.m. on a Monday, then the confidence level may be rather low that client device 101 is ready to have its operating system booted.

In step 503, control module 104 examines the confidence level determined in step 502 as well as the utilization of the resources of server blades 102 in data center 105. Utilization of the resources of server blades 102 in data center 105 may refer to the utilization of the processing capabilities of all the server blades 102.

In step 504, control module 104 determines whether to command an appropriate server blade 102 (referring to server blade 102 that meets the requirements of client device 101) to perform an action based on the confidence level determined in step 502 and the utilization of the resources of data center 105.

The action that may be performed may include the appropriate server blade 102 pre-booting the operating system of client device 101. By pre-booting the operating system of client device 101 prior to client device 101 actually sending a command to boot its operating system to server blade 102 (which may have been routed to the appropriate server blade 102 via control module 104 as described above), boot time is significantly reduced. Boot time is significantly reduced since client device's 101 image file does not have to be loaded or booted. The boot time may now only involve the time receiving the command from client device 101 to boot its operating system as well as the time that control module 104 authenticates client device 101 and identifies the appropriate server blade 102 that has pre-booted client device's 101 operating system.

In another embodiment, the action that may be performed may include pre-loading the client device's 101 image, e.g., operating system, onto the appropriate server blade 102. In this embodiment, the operating system of client device 101 is ready to be booted upon receipt of the command from client device 101 to boot its operating system. In this embodiment, the boot time for client device 101 is reduced since client device's 101 image file does not have to be loaded. Instead, the boot time may involve the time to receive the command from client device 101 to boot its operating system as well as the time that control module 104 authenticates client device 101 and identifies the appropriate server blade 102 with the pre-loaded client device's 101 image file in addition to the time for the appropriate server blade 102 to boot the pre-loaded image.

In another embodiment, the action that may be performed may include allocating a resource in the appropriate server blade 102 to boot an operating system of client device 101. In this embodiment, a resource, e.g., processing capability, in the appropriate server blade 102 is allocated to boot an operating system of client device 101 prior to the user attempting to boot its operating system. In this embodiment, the boot time for client device 101 is reduced since the resource, e.g., processing capability, in the appropriate server blade 102 does not have to be identified. In this embodiment, the boot time may involve the time to receive the command from client device 101, authenticate client device 101, identify the appropriate server blade 102, load client device's 101 image file into the appropriate server blade 102 and the time for the appropriate server blade 102 to actually boot the loaded client device's 101 image.

In one embodiment, a user of client device 101 may be able to schedule a time for the appropriate server blade 102 to perform one of actions mentioned above, e.g., pre-boot operating system of client device 101. In another embodiment, the appropriate server blade 102 may perform one of the actions mentioned above, e.g., pre-boot client device's 101 operating system, based upon the location of the user of client device 101, e.g., badge of user of client device 101 indicated user walked into office.

As stated above, control module 104 determines whether to command an appropriate server blade 102 (referring to server blade 102 that meets the requirements of client device 101) to perform an action based on the confidence level determined in step 502 and the utilization of the resources of data center 105. For example, if the confidence level as to whether client device 101 is likely to be booted is rather low and the utilization of the resources of server blades 102 is high, then an action, examples of which are provided above, is unlikely to occur. Conversely, if the confidence level as to whether client device 101 is likely to be booted is rather high and the utilization of the resources of server blades 102 is low, then an action, examples of which are provided above, is likely to occur.

If control module 104 determines to not command the appropriate server blade 102 to perform an action, examples of which are listed above, then, in step 502, control module 104 determines an updated confidence level as to whether client device 101 is likely to be booted based on the profile of client device 101 as well as the present time and day as described above.

If, however, control module 104 determines to command the appropriate server blade 102 to perform an action, examples of which are listed above, then, in step 505, control module 104 commands the appropriate server blade 102 to perform an action, examples of which are listed above. In step 506, the appropriate server blade 102 performs the action.

In step 507, the appropriate server blade 102 waits to receive an indication from client device 101, indirectly via control module 104, to boot its operating system. In step 508, the appropriate server blade 102 determines if it received such an indication from client device 101.

If the appropriate server blade 102 does not receive such an indication, then, in step 507, server blade 102 waits to receive the indication.

If, however, the appropriate server blade 102 received such an indication, then, in step 509, the appropriate server blade 102 activates client device 101. Activation may involve different actions performed by server blade 102 based upon the action performed by server blade 102 in step 506. For example, if server blade 102 pre-booted the operating system of client device 101 in step 506, then there is no further action that needs to be performed by server blade 102. In another example, if the client device's 101 image, e.g., operating system, was preloaded in server blade 102 in step 506, then server blade 102 may boot the client device's 101 pre-loaded image in order to activate client device 101.

It is noted that method 500 may include other and/or additional steps that, for clarity, are not depicted. It is further noted that method 500 may be executed in a different order presented and that the order presented in the discussion of FIG. 5 is illustrative. It is further noted that certain steps in method 500 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for reducing the boot time of a client device in a client device/data center environment comprising the steps of:
   creating a profile of said client device;
   determining a confidence level as to whether said client device is likely to be booted based on said profile of said client device;
   examining said confidence level and utilization of a plurality of server blades; and
   performing an action based on said confidence level and said utilization of said plurality of server blades, wherein said action is involved in booting an operating system of said client device, wherein said action is performed prior to a user of said client device attempting to boot said operating system of said client device.

2. The method as recited in claim 1, wherein said action comprises pre-booting an operating system of said client device.

3. The method as recited in claim 1, wherein said action comprises pre-loading an image of said client device.

4. The method as recited in claim 1, wherein said action comprises allocating a resource in a server blade of said plurality of server blades to boot an operating system of said client device.

5. The method as recited in claim 1, wherein said confidence level is dynamically updated based on present time and day and said profile of said client device.

6. The method as recited in claim 1 further comprising the steps of:
   receiving an indication from said client device to boot said operating system of said client device; and
   activating said client device having said operating system of said client device pre-booted prior to receiving said indication from said client device.

7. A computer program product embodied in a machine readable medium for reducing the boot time of a client device in a client device/data center environment comprising the programming steps of:
   creating a profile of said client device;
   determining a confidence level as to whether said client device is likely to be booted based on said profile of said client device;
   examining said confidence level and utilization of a plurality of server blades; and
   performing an action based on said confidence level and said utilization of said server blade, wherein said action is involved in booting an operating system of said client device, wherein said action is performed prior to a user of said client device attempting to boot said operating system of said client device.

8. The computer program product as recited in claim 7, wherein said action comprises pre-booting an operating system of said client device.

9. The computer program product as recited in claim 7, wherein said action comprises pre-loading an image of said client device.

10. The computer program product as recited in claim 7, wherein said action comprises allocating a resource in a server blade of said plurality of server blades to boot an operating system of said client device.

11. The computer program product as recited in claim 7, wherein said confidence level is dynamically updated based on present time and day and said profile of said client device.

12. The computer program product as recited in claim 7 further comprising the programming steps of:
   receiving an indication from said client device to boot said operating system of said client device; and
   activating said client device having said operating system of said client device pre-booted prior to receiving said indication from said client device.

13. A system, comprising:
   a control module;
   a plurality of server blades coupled to said control module;
   wherein said control module comprises:
      a first memory unit operable for storing a first computer program for reducing the boot time of a client device in a client device/data center environment; and
      a first processor coupled to said first memory unit, wherein said first processor, responsive to said first computer program, comprises:
         circuitry for creating a profile of said client device;
         circuitry for determining a confidence level as to whether said client device is likely to be booted based on said profile of said client device; and
         circuitry for examining said confidence level and utilization of said plurality of server blades; and
   wherein a server blade of said plurality of server blades comprises:
      a second memory unit operable for storing a second computer program for performing an action; and
      a second processor coupled to said second memory unit, wherein said second processor, responsive to said second computer program, comprises:

circuitry for performing an action based on said confidence level and said utilization of said plurality of server blades, wherein said action is involved in booting an operating system of said client device, wherein said action is performed prior to a user of said client device attempting to boot said operating system of said client device.

14. The system as recited in claim 13, wherein said action comprises pre-booting an operating system of said client device.

15. The system as recited in claim 13, wherein said action comprises pre-loading an image of said client device.

16. The system as recited in claim 13, wherein said action comprises allocating a resource in said server blade to boot an operating system of said client device.

17. The system as recited in claim 13, wherein said confidence level is dynamically updated based on present time and day and said profile of said client device.

18. The system as recited in claim 13, wherein said second processor further comprises:

circuitry for receiving an indication from said client device to boot said operating system of said client device; and circuitry for activating said client device having said operating system of said client device pre-booted prior to receiving said indication from said client device.

* * * * *